United States Patent
Makino

(10) Patent No.: US 11,323,613 B2
(45) Date of Patent: May 3, 2022

(54) IMAGE PICKUP APPARATUS THAT COMPOSITES IMAGES, CONTROL METHOD THEREFOR, AND STORAGE MEDIUM STORING PROGRAM FOR EXECUTING CONTROL METHOD

(71) Applicant: CANON KABUSHIKI KAISHA, Tokyo (JP)

(72) Inventor: Jun Makino, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/152,020

(22) Filed: Jan. 19, 2021

(65) Prior Publication Data

US 2021/0250493 A1    Aug. 12, 2021

(30) Foreign Application Priority Data

Feb. 6, 2020  (JP) .............................. JP2020-018947

(51) Int. Cl.
*H04N 5/232*  (2006.01)
*G06K 9/62*  (2022.01)
*G06V 10/75*  (2022.01)

(52) U.S. Cl.
CPC ....... *H04N 5/23222* (2013.01); *G06V 10/758* (2022.01); *H04N 5/23218* (2018.08)

(58) Field of Classification Search
CPC ........... H04N 5/23222; H04N 5/23218; H04N 5/23229; H04N 5/2355; H04N 5/2353; H04N 5/265; G06K 9/6212; G06K 9/4642

See application file for complete search history.

(56) References Cited

U.S. PATENT DOCUMENTS

| | | | |
|---|---|---|---|
| 8,228,400 B2* | 7/2012 | Liu ....................... | H04N 5/235 348/239 |
| 9,936,144 B2 | 4/2018 | Hatakeyama | |
| 10,244,184 B2* | 3/2019 | Liu ....................... | H04N 5/265 |
| 10,359,498 B2* | 7/2019 | Ikeda ................. | H04N 5/23245 |
| 10,701,279 B2* | 6/2020 | Hsieh .................... | G06T 11/60 |

(Continued)

FOREIGN PATENT DOCUMENTS

| JP | 2014171146 A | 9/2014 |
|---|---|---|
| JP | 2016076869 A | 5/2016 |

*Primary Examiner* — Pritham D Prabhakher
(74) *Attorney, Agent, or Firm* — Rossi, Kimms & McDowell LLP

(57) ABSTRACT

An image pickup apparatus that is capable of obtaining a composite image having a sufficient desired effect without considering the required number of pickup images by a user. An obtaining unit obtains an image pickup condition of an object. A determination unit determines a termination condition according to the image pickup condition. An image pickup unit picks up an image of the object. An image composition unit generates a composite image of a series of every image of the object picked up by the image pickup unit whenever any image of the object is picked up by the image pickup unit. A feature-amount calculation unit calculates a feature amount of the composite image whenever the composite image concerned is generated. An output unit outputs the composite image as a final composite image of which the feature amount calculated by the feature-amount calculation unit satisfies the termination condition.

13 Claims, 14 Drawing Sheets

(56) References Cited

U.S. PATENT DOCUMENTS

| | | | |
|---|---|---|---|
| 2010/0265357 A1* | 10/2010 | Liu | H04N 5/235 |
| | | | 348/223.1 |
| 2014/0313367 A1* | 10/2014 | Iwasaki | H04N 5/265 |
| | | | 348/222.1 |
| 2014/0362258 A1* | 12/2014 | Ichikawa | H04N 5/23229 |
| | | | 348/240.1 |
| 2016/0073011 A1* | 3/2016 | Fujita | G06T 11/001 |
| | | | 348/207.11 |
| 2016/0105596 A1* | 4/2016 | Hatakeyama | H04N 5/2355 |
| | | | 348/239 |
| 2017/0134666 A1* | 5/2017 | Liu | H04N 5/91 |
| 2017/0171474 A1* | 6/2017 | Aota | G06T 5/009 |
| 2019/0122040 A1* | 4/2019 | Baldacci | G06K 9/00718 |

* cited by examiner

IMAGE PICKUP APPARATUS THAT COMPOSITES IMAGES, CONTROL METHOD THEREFOR, AND STORAGE MEDIUM STORING PROGRAM FOR EXECUTING CONTROL METHOD

BACKGROUND OF THE INVENTION

Field of the Invention

The present invention relates to an image pickup apparatus that generates an image having a certain effect by compositing a plurality of images, a control method therefor, and a storage medium storing a program for executing the control method.

Description of the Related Art

There is a known image pickup method that picks up a plurality of images and adds various kinds of image quality improvement and special effects by compositing the images.

For example, there is a well-known process that picks up short-time proper exposure images and improves an S/N ratio or a resolution by calculating an average of the images after pickup. Moreover, there is a known method of improving a dynamic range by picking up images of which exposures are different and by compositing the images.

Furthermore, there is a known process that picks up short-time exposure images so as not to almost give time intervals and composites these images to obtain an image effect that is equivalent to an effect obtained by long-time exposure using an ND filter. For example, there is a known method that picks up and composites short-time exposure images to obtain an image having an effect that emphasizes a "flow" of water that would be obtained by long-time exposure of a landscape in which water flows like a waterfall.

Japanese Laid-Open Patent Publication (Kokai) No. 2016-76869 (JP 2016-76869A) (counterpart of U.S. Pat. No. 9,936,144) discloses such a method that performs a threshold determination for every pixel data for each of exposures and selects a composition process on the basis of a result of the threshold determinations so that a locus of light of long-time exposure will have an effect that a user desires.

Moreover, Japanese Laid-Open Patent Publication (Kokai) No. 2014-171146 (JP 2014-171146A) discloses a process that composites two images first, determines the number of additional images to be picked up on the basis of a state of an object in the composite image, picks up images of the determined number, and composites all the pickup images so as to obtain a high dynamic range (HDR) image.

Although the method of JP 2016-76869A automatically selects a composite process on the basis of the result of the threshold determinations, there is a problem that a user is required to determine whether the locus of light of long-time exposure has the effect that the user desires.

Moreover, since the process of JP 2014-171146A determines the number of composite images required to obtain a HDR image as a final image on the basis of the first two images only, the dynamic range of the final image may not be sufficiently high.

Namely, the processes of the above-mentioned publications are difficult to determine how many images should be picked up and be composited in order to obtain an image to which the sufficient effect that a user desires is added, when a user wants to obtain an image to which an effect that the user desires, such as image quality improvement and a special effect, is added.

SUMMARY OF THE INVENTION

The present invention provides an image pickup apparatus, a control method, and a storage medium storing a program for executing the control method, which are capable of obtaining a composite image having a sufficient desired effect without considering the required number of pickup images by a user.

Accordingly, a first aspect of the present invention provides an image pickup apparatus including an obtaining unit configured to obtain an image pickup condition of an object, a determination unit configured to determine a termination condition according to the image pickup condition, an image pickup unit configured to pick up an image of the object, an image composition unit configured to generate a composite image of a series of every image of the object picked up by the image pickup unit whenever any image of the object is picked up by the image pickup unit, a feature-amount calculation unit configured to calculate a feature amount of the composite image whenever the composite image concerned is generated, and an output unit configured to output the composite image as a final composite image of which the feature amount calculated by the feature-amount calculation unit satisfies the termination condition.

Accordingly, a second aspect of the present invention provides a control method for an image pickup apparatus, the control method including an obtaining step of obtaining an image pickup condition of an object from a user, a determination step of determining a termination condition according to the image pickup condition, an image pickup step of picking up an image of the object, an image composition step of generating a composite image of a series of every image of the object picked up in the image pickup step whenever an image of the object is picked up in the image pickup step, a feature-amount calculation step of calculating a feature amount of the composite image whenever the composite image concerned is generated, and an output step of outputting the composite image as a final composite image of which the feature amount calculated in the feature-amount calculation step satisfies the termination condition.

Accordingly, a third aspect of the present invention provides a non-transitory computer-readable storage medium storing a control program causing a computer to execute the control method of the second aspect.

According to the present invention, a composite image having a sufficient desired effect is obtained without considering the required number of pickup images by a user.

Further features of the present invention will become apparent from the following description of exemplary embodiments with reference to the attached drawings.

DESCRIPTION OF THE EMBODIMENTS

Figure 1:
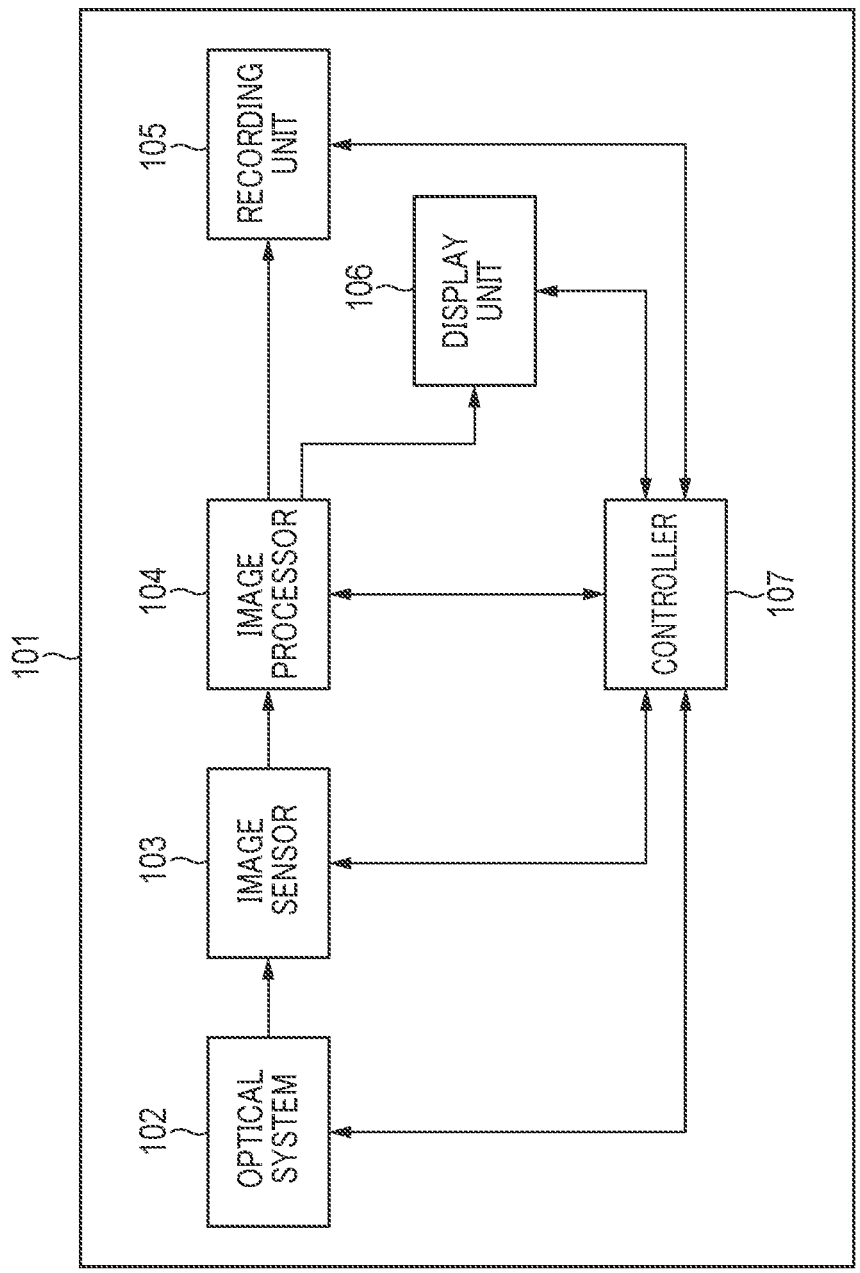
FIG. 1 is a block diagram showing an entire image pickup apparatus concerning a first embodiment.

Hereafter, embodiments according to the present invention will be described in detail by referring to the drawings.

Hereinafter, an image pickup apparatus concerning a first embodiment of the present invention and its control method will be described by referring to FIG. 1 through FIG. 9. FIG. 1 is a block diagram showing an entire image pickup apparatus 101 concerning the first embodiment.

As shown in FIG. 1, the image pickup apparatus 101 is provided with an optical system 102, an image sensor 103, an image processor 104, a recording unit 105, a display unit 106, and a controller 107.

The optical system 102 is provided with an optical diaphragm, a focus adjustment mechanism, a lens like a zoom lens, etc. The image sensor 103 is a photoelectric conversion element, such as a CCD or a CMOS, that converts an object image into an electrical signal and generates a pickup image. That is, the image sensor 103 is an image pickup unit that picks up an image of an object.

The image processor 104 applies a developing process like a debayer process to the signal from the image sensor 103 and generates image data. The recording unit 105 stores image data. The display unit 106 displays image data, image pickup data, etc. The controller 107 controls the optical system 102, image sensor 103, image processor 104, recording unit 105, and display unit 106.

Figure 2:
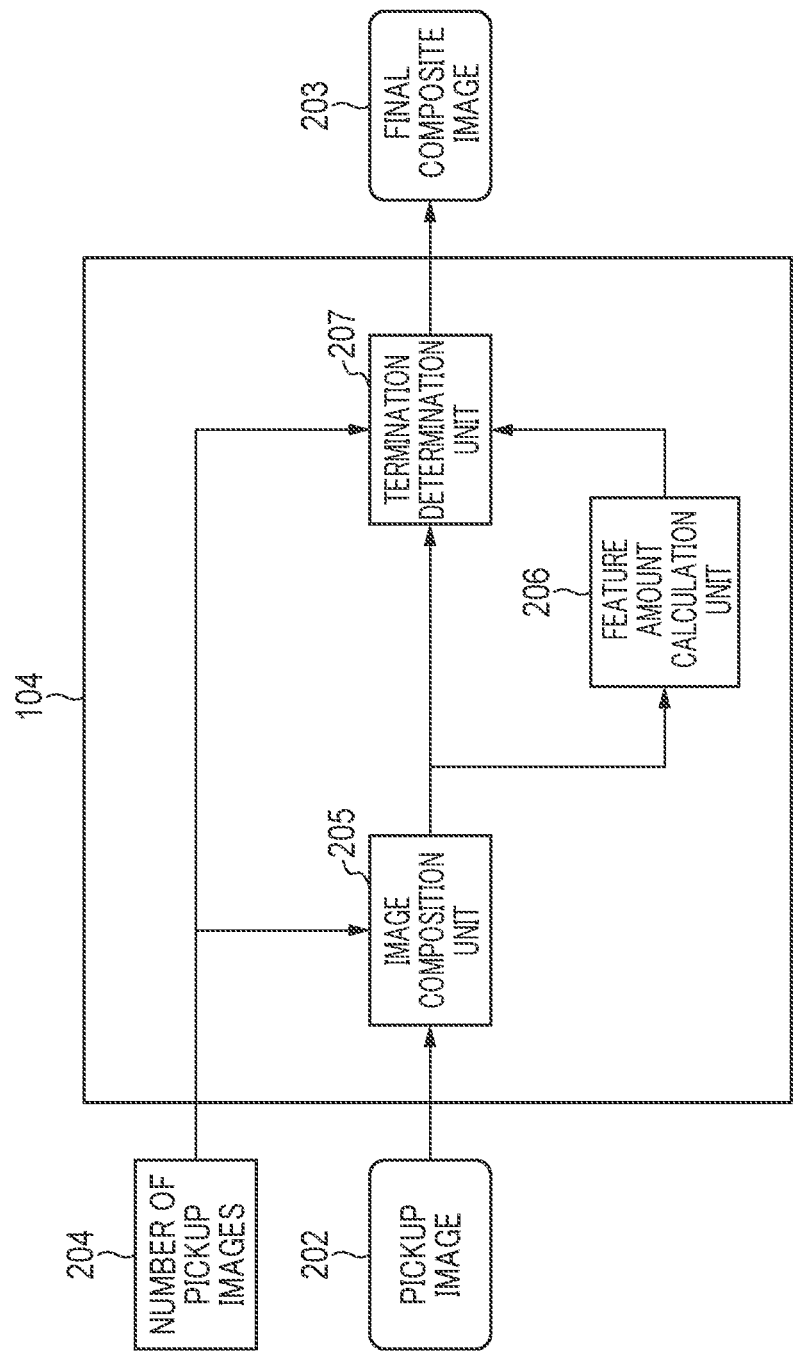
FIG. 2 is a view describing a flow of an image process of the first embodiment by an image processor in FIG. 1.

The image processor 104 is provided with an image composition unit 205, a feature-amount calculation unit 206, and a termination determination unit 207 as shown in FIG. 2. The image processor 104 executes an image process that successively composites pickup images 202 that are input and generates a final composite image 203. At this time, the controller 107 inputs information about the number of pickup images 204 into the image processor 104. The information shows an order of a pickup image that is now input into the image processor 104 and is being composited.

The image composition unit 205 generates a composite image of a series of pickup images whenever the image sensor 103 picks up an image of the object. Contents of the image composition of this embodiment will be mentioned later by referring to FIG. 5 through FIG. 9.

The feature-amount calculation unit 206 calculates a feature amount relevant to the composite image that the image processor 104 successively generates. It is not necessary to find the feature amount about the entire composite image. That is, the feature amount is calculated only about a place where a user wants to obtain a predetermined effect in the final composite image 203. In this embodiment, a UI screen 300 (FIG. 3) is displayed on the display unit 106 when a user wants to obtain an effect that emphasizes a "flow" in a pickup image of a fluid object like a waterfall. After that, the user selects a place (a tartlet region 302 shown as a hatched area that is the center of the flow of the waterfall in the example of FIG. 3) that needs the effect that emphasizes a "flow" in a waterfall image 301 previewed in the UI screen 300. The feature-amount calculation unit 206 calculates the feature amount only from this tartlet region 302 in the composite image. It should be noted that the target region 302 that is the center of the flow of the waterfall may not be selected by the user. The target region 302 may be found by scene discrimination, motion detection, etc. Moreover, contents of the feature amount calculated by the feature-amount calculation unit 206 will be mentioned later.

The termination determination unit 207 determines whether the feature amount satisfies a termination condition and whether the number of pickup images 204 reaches the maximum number of pickup images. Moreover, on the basis of the results of the determinations, the termination determination unit 207 determines whether the image composition by the image composition unit 205 is terminated and whether an additional image pickup operation is terminated. In this embodiment, when a user selects a flow effect (smoothness of a fluid object) from among "Large", "Medium", and "Small" in a message area 303 of the UI screen 300 shown in FIG. 3, the controller 107 sets up a threshold corresponding to the selected flow effect. That is, the controller 107 also has a function as a determination unit that determines a termination condition according to the image pickup condition designated by the user. When the feature amount becomes less than this threshold, the termination determination unit 207 determines that the feature amount satisfies the termination condition. Then, the termination determination unit 207 outputs the final composite image 203 of which the feature amount satisfies the termination condition. That is, the termination determination unit 207 also has a function as an output unit that outputs the final composite image 203. In addition, this termination condition may be beforehand defined by the controller 107 depending on the image pickup method.

Figure 4:
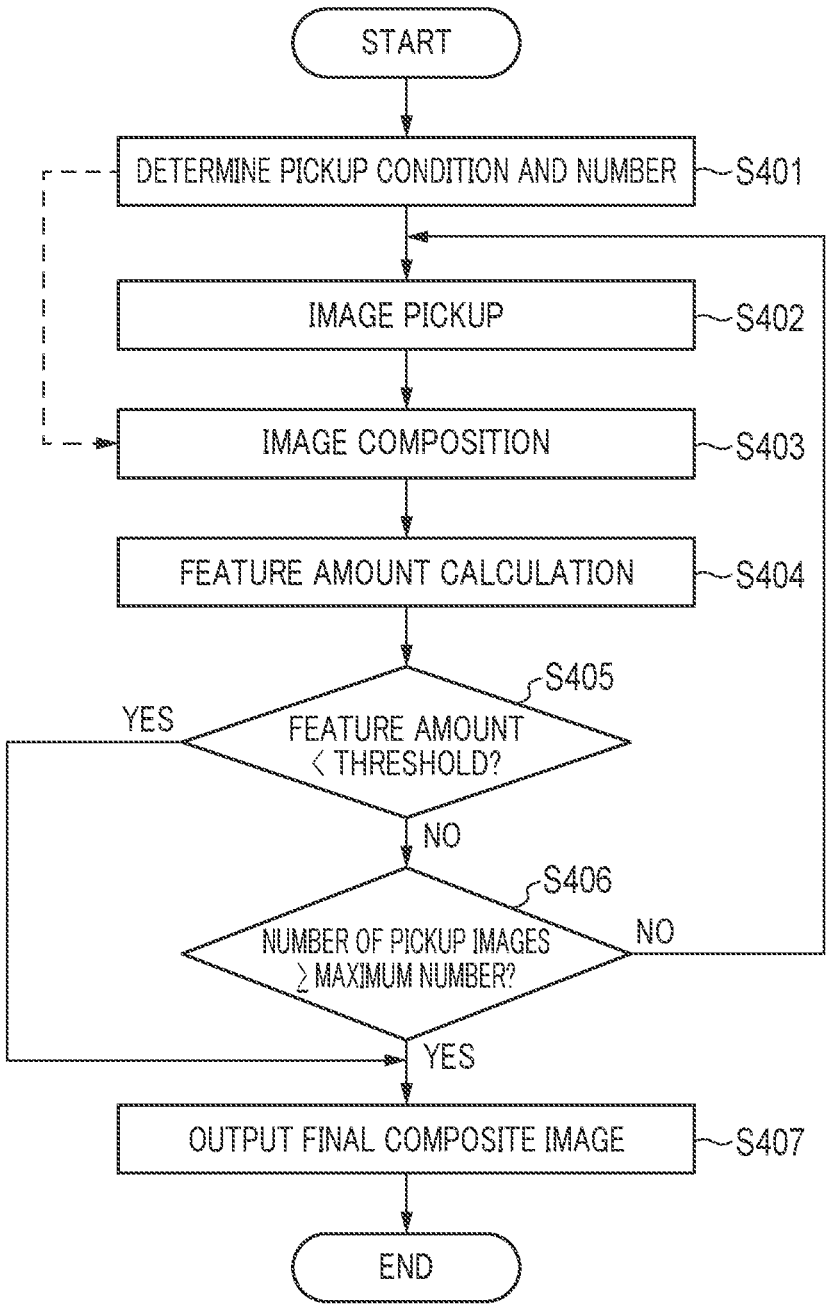
FIG. 4 is a flowchart showing a composite image generation process concerning the first embodiment.

FIG. 4 is a flowchart showing a composite image generation process concerning the first embodiment. This process is executed when the controller 107 and the image processor 104 read programs that are beforehand held inside.

The controller 107 first determines an image pickup condition, the number of pickup images, a feature amount, a termination condition, etc. in a step S401 in FIG. 4.

The image pickup condition determined in this step is "to pick up an image having an effect that emphasizes a flow" that is used when picking up a waterfall image. In this embodiment, the user determines the image pickup condition that is "to pick up an image having an effect that emphasizes a flow" when the UI screen 300 is displayed on the display unit 106. When such an image pickup condition is determined, operations, such as obtainment of a plurality of appropriate exposure images and execution of average composition, of an image pickup process and a composition process are determined, for example. After that, when the user selects the target region 302 that is the center of the flow of the waterfall in the waterfall image 301 that is preview displayed on the UI screen 300, the region in which the feature amount is calculated is determined. That is, the controller 107 and display unit 106 function as an obtaining unit that obtains an image pickup condition of an object from a user. Furthermore, when the user designates the flow effect in the message area 303 of the UI screen 300, the termination condition is determined according to the designated flow effect and the content of the feature amount set up beforehand.

Moreover, the number of pickup images determined in this step is an upper limit (the maximum number of pickup images) of the number of images that are subjected to the composition process. It should be noted that a feature amount is not limited to the feature amount exemplified hereinafter as long as a feature amount is able to express a "flow" of an image. Moreover, the termination condition may be a condition that is able to determine whether the effect of a "flow" is sufficient on the basis of the found feature amount.

Next, the controller 107 controls the optical system 102 and image sensor 103 to generate one pickup image in a step S402. It should be noted that the image processor 104 may add necessary processes (what is called development processes, such as a debayer process and a white balance process) to the process of the step S402 so that the following composition process may become available.

Figure 5:
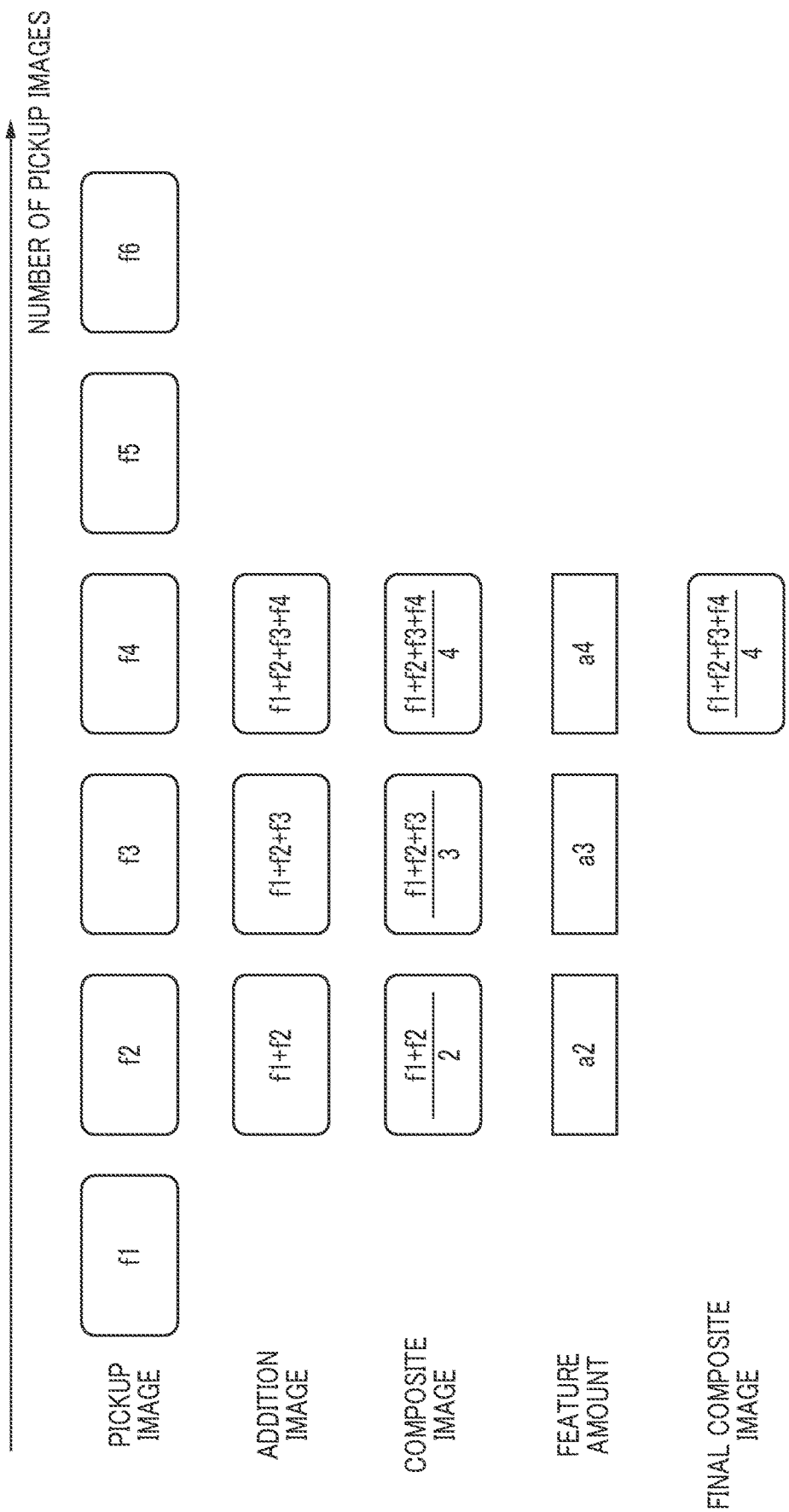
FIG. 5 is a view describing image composition executed in a step S403 in FIG. 4.

Next, an image composition is performed in a step S403. The process of the step S403 is performed when a second pickup image or later is generated in the immediately preceding step S402. The image composition will be described by referring to FIG. 5 using the case where the waterfall image 301 is picked up under the image pickup condition that is "to pick up an image having an effect that emphasizes a flow". FIG. 5 schematically shows a state where the image pickup and the composition process progress sequentially from left toward right as shown by an arrow in an upper row. Details of processing time and timing are omitted.

A first line in FIG. 5 shows pickup images f1 through f6 that are sequentially generated one by one in the step S402.

The following line shows addition images that are sequentially added whenever one of the pickup images f1 through f6 is picked up. That is, when the second pickup image f2 is picked up after picking up the first pickup image f1, an addition image f1+f2 is generated by adding each pixel value of the first pickup image f1 and a corresponding pixel value of the second pickup image f2. Hereinafter, when the third pickup image f3 is picked up, an addition image f1+f2+f3 is generated, and when the fourth pickup image f4 is picked up, an addition image f1+f2+f3+f4 is generated.

The following line shows composite images each of which is an average image that is calculated from a generated addition image and the number of pickup images up to the present, whenever the addition image is generated. That is, when the second pickup image f2 is picked up and the addition image f1+f2 is generated, an average image obtained by dividing the addition image f1+f2 by the number of pickup images 2 becomes a composite image (f1+f2)/2. Similarly, when the third pickup image f3 is picked up and the addition image f1+f2+f3 is generated, a composite image (f1+f2+f3)/3 is calculated by dividing the addition image f1+f2+f3 by 3. Similarly, when the fourth pickup image f3 is picked up and the addition image f1+f2+f3+f4 is generated, a composite image (f1+f2+f3+f4)/4 is calculated by dividing the addition image f1+f2+f3+f4 by 4.

In this way, a composite image is generated in the step S403, whenever one pickup image is generated in the step S402.

Figure 6A:
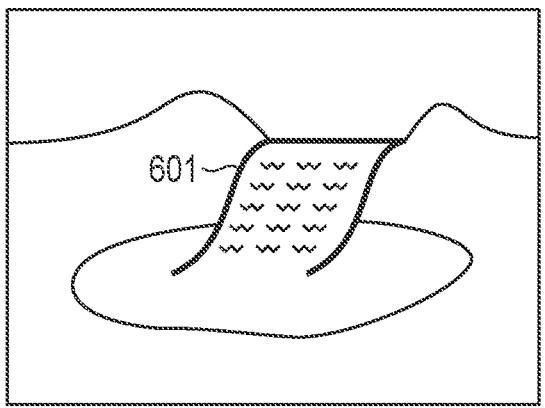
FIG. 6A through FIG. 6D are views showing waterfall images corresponding to the respective composite images shown in FIG. 5.
Figure 6B:
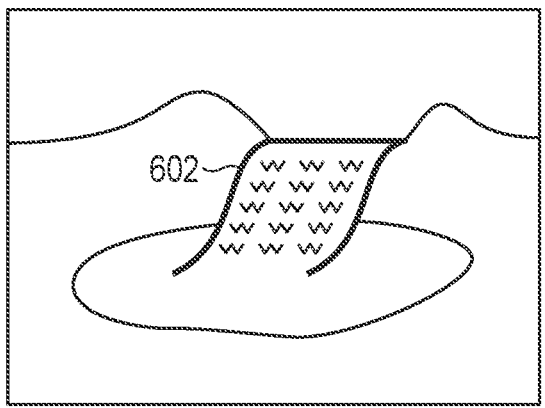
Figure 6C:
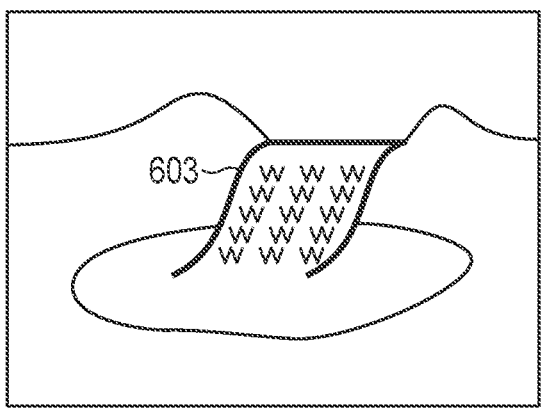
Figure 6D:
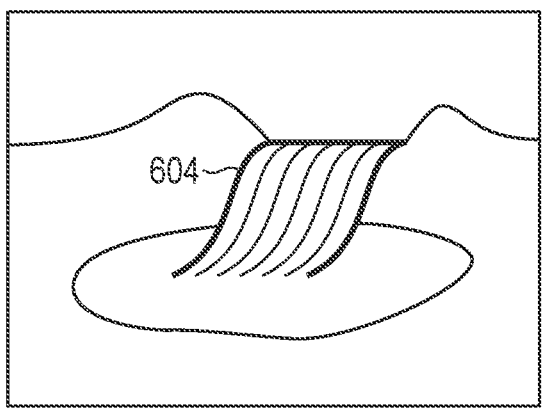

FIG. 6A through FIG. 6D show the waterfall images in the composite images shown in FIG. 5. FIG. 6A shows the pickup image f1 generated by the first pickup, and the "flow" of the water surface of the waterfall 601 is little. FIG. 6B through FIG. 6D show the states where the pickup images f1 through f4 are composited sequentially and are equivalent to the composite images (f1+f2)/2, (f1+f2+f3)/3, and (f1+f2+f3+f4)/4 in FIG. 5, respectively. In this embodiment, a case where the composite image (f1+f2+f3+f4)/4 in FIG. 5 has a sufficient effect of the "flow" of the waterfall will be described.

Referring back to the flowchart of FIG. 4, the feature amount of the composite image generated in the immediately preceding step S403 will be calculated in a step S404. The feature amount of the composite image is determined in the step S401 according to an object and a result. This embodiment describes the feature amount of the composite image in the case where the "flow" effect is given in the target region 302 in FIG. 3 that is determined as a region where the feature amount is calculated in the step S401.

Figure 3:
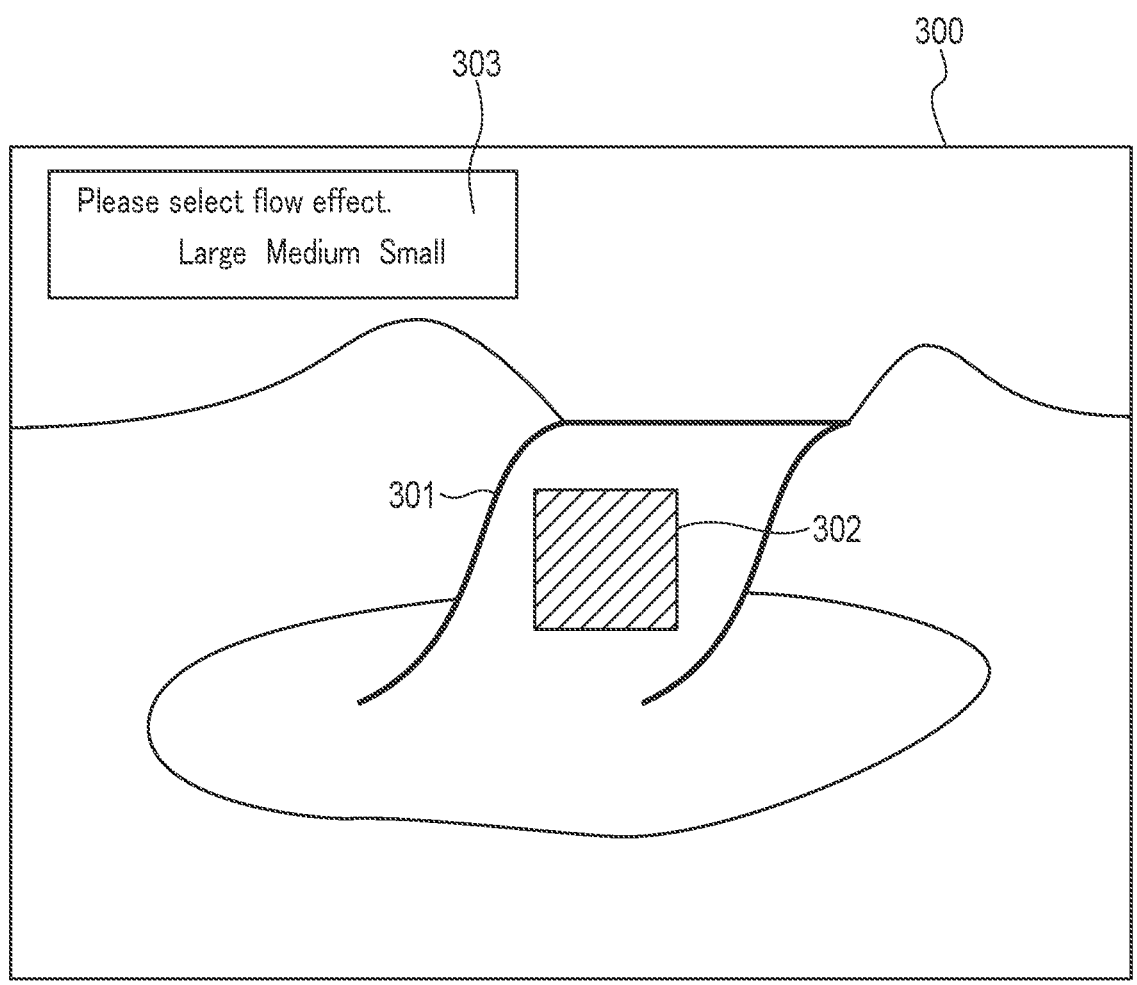
FIG. 3 is an example of a UI screen displayed at a time of picking up an image of a waterfall.
Figure 7A:
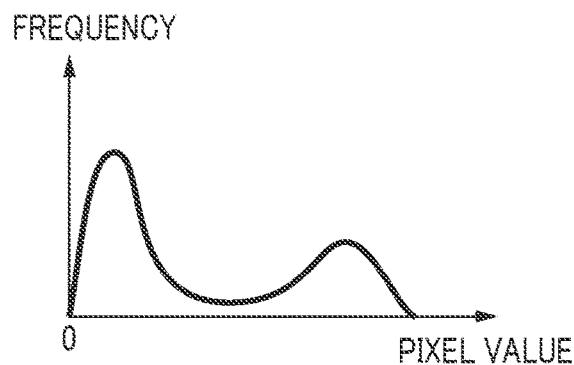
FIG. 7A through FIG. 7F are graphs showing histograms of pixel values within a target region in FIG. 3 in the respective composite images shown in FIG. 5.
Figure 7B:
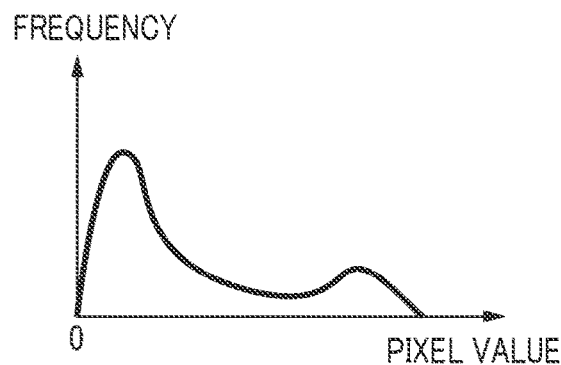
Figure 7C:
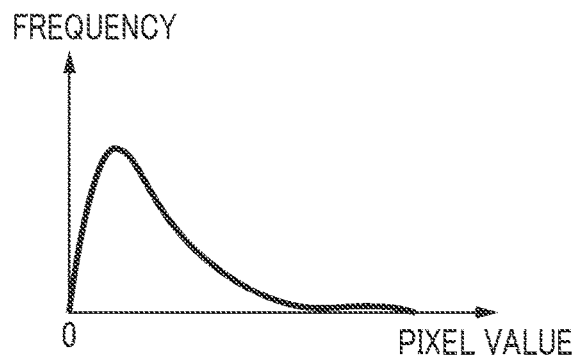
Figure 7D:
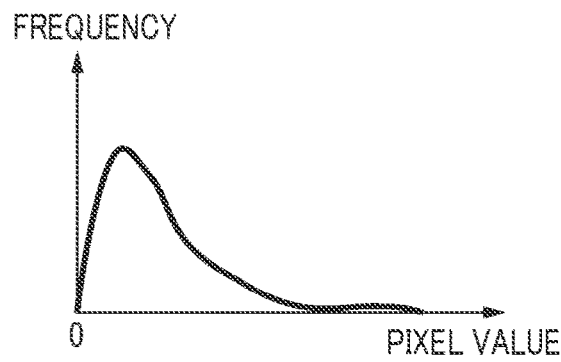
Figure 7E:
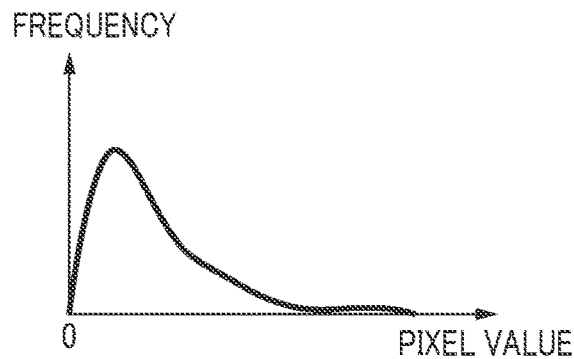
Figure 7F:
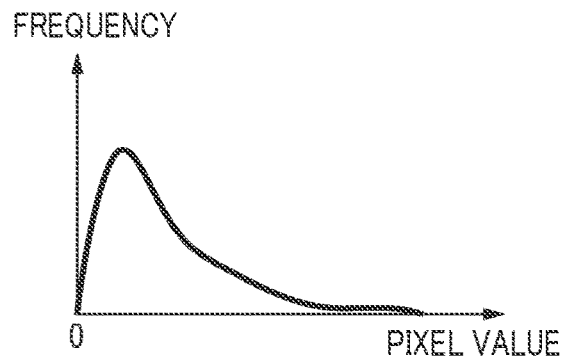

FIG. 7A through FIG. 7D are graphs showing histograms of pixel values within the target region in FIG. 3 in the respective composite images shown in FIG. 5. In each of the graphs of FIG. 7A through FIG. 7D, a horizontal axis shows a pixel value, and a vertical axis shows a frequency of each pixel value. FIG. 7A is a histogram that is found about the first pickup image f1, and FIG. 7B is a histogram that is found about the composite image (f1+f2)/2. Moreover, FIG. 7C is a histogram that is found about the composite image (f1+f2+f3)/3, and FIG. 7D is a histogram that is found about the composite image (f1+f2+f3+f4)/4. As shown in FIG. 7A through FIG. 7D, a shape variation of a histogram becomes small as the number of composite images increases. That is, the "flow" effect of the waterfall image approaches a certain effect, and a variation becomes small. Accordingly, this shape variation of the histogram can be used as the feature amount. In such a case, the termination determination unit (output unit) 207 determines that the termination condition is satisfied in a case where the variation of the histogram of the composite image becomes less than a first threshold. Specifically, a difference value between a frequency of the histogram of the previously-generated composite image and a frequency of the histogram of the newly-generated composite image is calculated for every pixel value. And then, the shape variation of the histogram is found by calculating a total sum of a square of the difference value. That is, the shape change $\Delta H$ of the histogram is found by the following formula using a frequency $xi$ of the histogram of the previously-generated composite image of a certain pixel value $i$ and a frequency $yi$ of the histogram of the newly-generated composite image of the certain pixel value $i$. The shape change $\Delta H$ may be used as the feature amount.

$$\Delta H = \sum_i (yi - xi)^2 \qquad \text{[Formula 1]}$$

Moreover, when a cross correlation function value between the histogram of the previously-generated composite image and the histogram of the newly-generated composite image is found for a pair of a pixel value and frequency, the cross correlation function value may be used as the feature amount. In this case, the cross correlation function value approaches 1.0 as the shape variation of the histogram becomes small.

Figure 8:
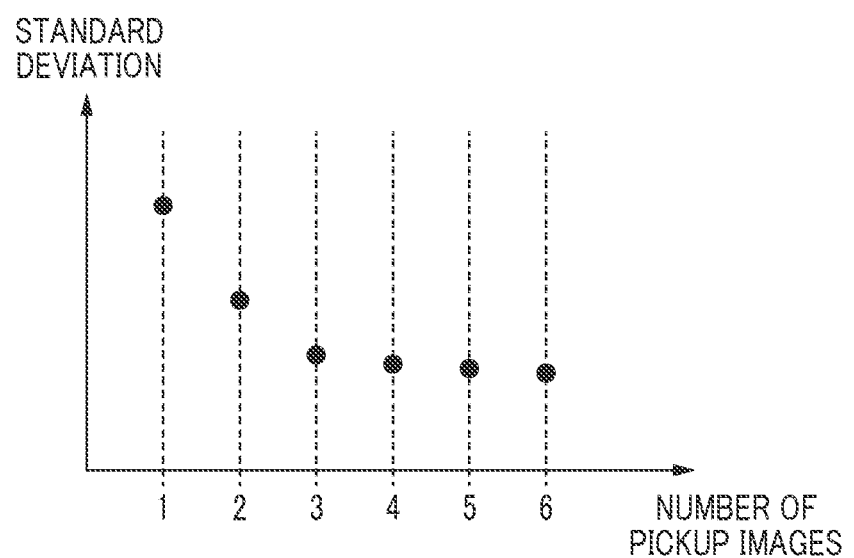
FIG. 8 is a graph showing standard deviations of the pixel values within the target region in FIG. 3 in the respective composite images shown in FIG. 5.

Moreover, a dispersion or a standard deviation of the pixel values in the target region 302 in FIG. 3 may be used as the feature amount. FIG. 8 shows the standard deviation of the pixel values in the target region 302 in FIG. 3 in each composite image shown in FIG. 5. In FIG. 8, a horizontal axis shows the number of composite images (the number of pickup images) and a vertical axis shows the standard deviation of the composite image. As shown in FIG. 8, the variation of the standard deviation becomes small as the number of composite image increases. That is, the "flow" effect approaches the certain effect, and the variation becomes small. Accordingly, the variation of the standard deviation can also be used as the feature amount. In such a case, the termination determination unit (output unit) 207 determines that the termination condition is satisfied in a case where the variation of the standard deviation of the composite image becomes less than a second threshold.

Figure 9:
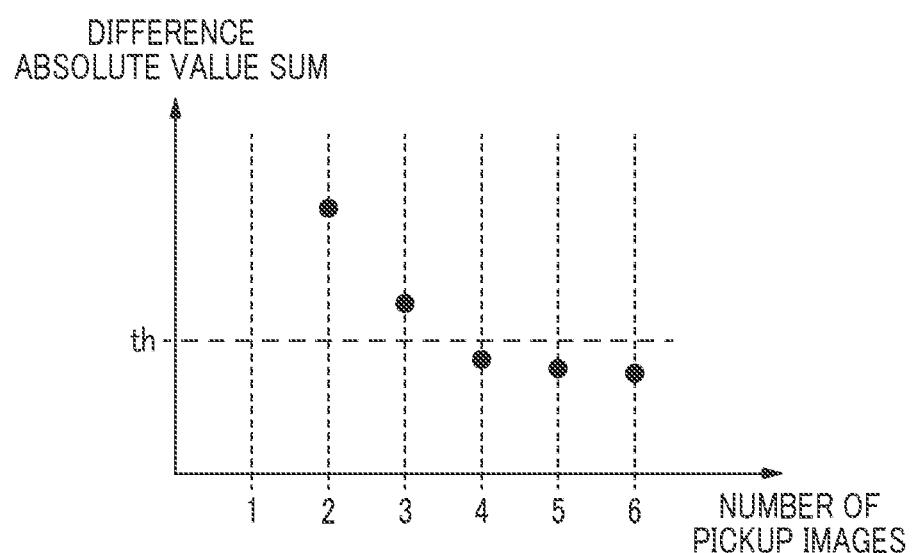
FIG. 9 is a graph showing difference absolute value sums of the pixel values within the target region in FIG. 3 in the respective composite images shown in FIG. 5.

Moreover, correlation between the adjacent composite images may be used as the feature amount. For example, a difference absolute value sum of the composite image at the time when the number of pickup images is three and the composite image at the time when the number of pickup images is two is found as the correlation of the adjacent composite images at the time when the number of pickup images is three. FIG. 9 shows the difference absolute value sum of the pixel values in the target region 302 in FIG. 3 in each composite image shown in FIG. 5. As shown in FIG. 9, the difference absolute value sum becomes small as the number of composited pickup images increases. That is, the "flow" effect approaches the certain effect, and the variation becomes small. Accordingly, the variation of the difference absolute value sum can also be used as the feature amount. In such a case, the termination determination unit (output unit) 207 determines that the termination condition is satisfied in a case where the variation of the difference absolute value sum of the composite image becomes less than a third threshold.

Although the histogram, dispersion, standard deviation, and difference absolute value sum are exemplified as the feature amount, a combination of them can also be used as the feature amount.

Referring back to the flowchart of FIG. 4 again, it is determined whether the feature amount of the composite image calculated in the step S404 satisfies the termination condition (whether the feature amount is less than a threshold) in a step S405. That is, when it is determined that the composite image has the effect required by the user on the basis of the feature amount calculated in the step S404, for example, when it is determined that a condition that the "flow" effect of the waterfall image in the composite image is large is sufficiently satisfied, the image pickup operation is stopped, and the process proceeds to a step S407. In the step S407, the final composite image is output (is displayed on the display unit 106 or is record into the recording unit 105), and this process is finished. For example, when the feature amount is the histogram, when the shape variation of the histogram is less than the threshold that is the termination condition determined in the step S401, it is determined that the "flow" effect of the waterfall image is sufficient, and the image pickup operation is stopped. Moreover, when the feature amount is the standard deviation, when the shape variation of the standard deviation is less than the threshold that is the termination condition determined in the step S401, it is determined that the "flow" effect of the waterfall image is sufficient, and the image pickup operation is stopped. Moreover, when the feature amount is the difference absolute value sum, when the shape variation of the difference absolute value sum is less than the threshold that is the termination condition determined in the step S401, or when the difference absolute value sum is less than a threshold th shown in FIG. 9, it is determined that the "flow" effect of the waterfall image is sufficient, and the image pickup operation is stopped. Alternatively, when it is determined that the "flow" effect of the waterfall image is sufficient on the basis of the combination of the histogram, standard deviation, and difference absolute value sum, the image pickup operation is stopped.

In the meantime, as a result of the determination in the step S405, when it is determined that the feature amount of the composite image calculated in the step S404 does not satisfy the termination condition (the feature amount is more than the threshold), the process proceeds to a step S406. In the step S406, when the number of pickup images determined does not reach the maximum number of pickup images determined in the step S401, the process returns to the step S402 and the image pickup operation is repeated. When the number of pickup images reaches the maximum number of pickup images, the image pickup operation stops, the process proceeds to the step S407, the final composite image is output, and this process is finished.

Referring back to FIG. 5, the feature amount and the final output image will be described. As mentioned above, whenever a composite image is generated, the feature amount of the composite image is calculated. For example, when the second pickup image f2 is generated and the composite image (f1+f2)/2 is generated, the feature amount a2 is found about the composite image (f1+f2)/2. In this embodiment, the feature amount a2 shall not satisfy the termination condition (the effect required by a user for the composite image shall be insufficient) because the feature amount a2 is more than the threshold. Accordingly, the following third pickup image f3 is generated and the composite image (f1+f2+f3)/3 is generated, and the feature amount a3 is found about the composite image (f1+f2+f3)/3. In this embodiment, the feature amount a3 shall not satisfy the termination condition because the feature amount a3 is more than the threshold. Accordingly, furthermore, the following fourth pickup image f4 is generated and the composite image (f1+f2+f3+f4)/4 is generated, and the feature amount a4 is found about the composite image (f1+f2+f3+f4)/4. In this embodiment, the feature amount a4 shall satisfy the termination condition because the feature amount a4 is less than the threshold. Accordingly, the image pickup operations to generate the fifth pickup image f5 and sixth pickup image f6 stop and no composite image is generated. That is, in this embodiment, the final composite image that is output in the step S407 is the composite image (f1+f2+f3+f4)/4 generated when the fourth pickup image f4 is generated.

In this embodiment, when the feature amount a4 satisfies the termination condition, the subsequent image pickup operations stop. In the meantime, the fifth pickup image f5 and the sixth pickup image f6 may be picked up in parallel to the output of the final composite image. That is, the present invention merely requires not to generate a new composite image after the feature amount calculated in the step S404 satisfies the termination condition, and it is not necessary to stop a subsequent image pickup operation.

As mentioned above, composite images are generated successively while picking up images and when the feature amount of the generated composite image satisfies the termination condition, the composite image is output as the final composite image in this embodiment. Accordingly, a composite image having a sufficient effect required by a user is obtained without considering the required number of pickup images by the user.

Hereinafter, an image pickup apparatus concerning a second embodiment of the present invention and its control method will be described by referring to FIG. 10 through FIG. 14D. The second embodiment is different from the first embodiment in a point of considering an image pickup condition at a time of generation of a composite image. The entire configuration of the second embodiment is the same as that of the first embodiment. Accordingly, a configuration that is the same as that of the first embodiment is denoted by the same reference number and an overlapped description is omitted.

Figure 10:
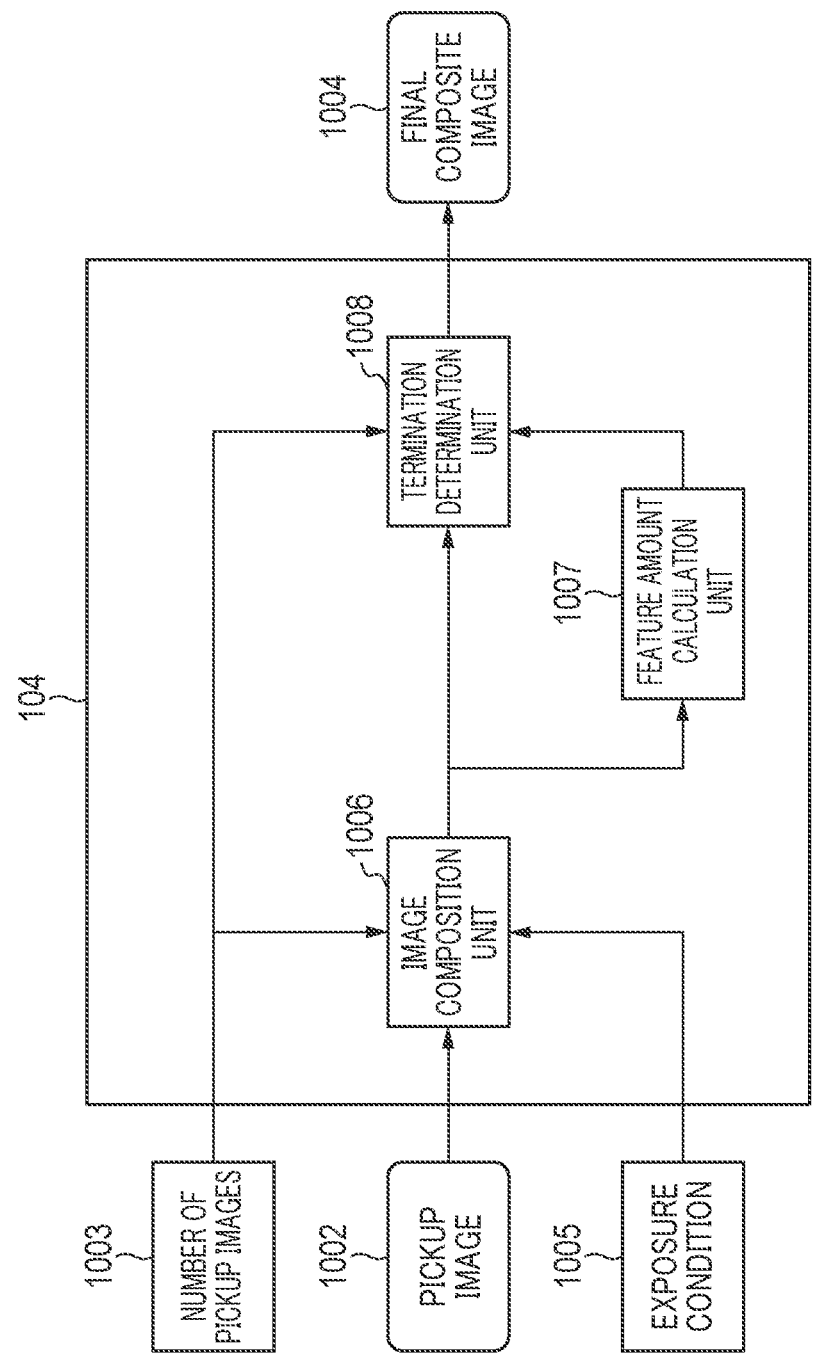
FIG. 10 is a view describing a flow of an image process by an image processor of an image pickup apparatus concerning a second embodiment.

FIG. 10 is a view describing a flow of an image process executed by an image processor 104 of the image pickup apparatus concerning the second embodiment.

The image processor 104 is provided with an image composition unit 1006, a feature-amount calculation unit 1007, and a termination determination unit 1008 as shown in FIG. 10. The image processor 104 executes an image process that successively composites pickup images 1002 that are input and generates a final composite image 1004. At this time, the controller 107 inputs information about the number of pickup images 1003 into the image processor 104. The information shows an order of a pickup image that is now input into the image processor 104 and is being composited. Moreover, the controller 107 inputs information about the exposure conditions 1005, such as exposure time, an aperture value, and a value of ISO, that are set corresponding to the image pickup condition into the image processor 104.

The image composition unit 1006 performs image composition of pickup images considering the image pickup condition. Contents of the image composition of this embodiment will be mentioned later by referring to FIG. 12 through FIG. 14.

The feature-amount calculation unit 1007 calculates a feature amount relevant to the composite image that the image processor 104 successively generates. As with the first embodiment, it is not necessary to find the feature amount about the entire composite image. That is, the feature amount is calculated only about a place where a user wants to obtain a predetermined effect in the final composite image 1004. Also, in this embodiment, the feature amount is calculated about the target region 302 that is the center of the flow of the waterfall in FIG. 3 as with the first embodiment. Contents of the feature amount will be mentioned later.

The termination determination unit 1008 determines whether the feature amount satisfies a termination condition and whether the number of pickup images 1003 reaches the maximum number of pickup images. Moreover, on the basis of the results of the determinations, the termination determination unit 1007 determines whether the image composition by the image composition unit 1006 is terminated and whether an additional image pickup operation is terminated.

An example of the image composition in a case where the image pickup condition is "to pick up a high resolution image" will be described first using FIG. 11, FIG. 12, and FIG. 13A through FIG. 13F.

Figure 11:
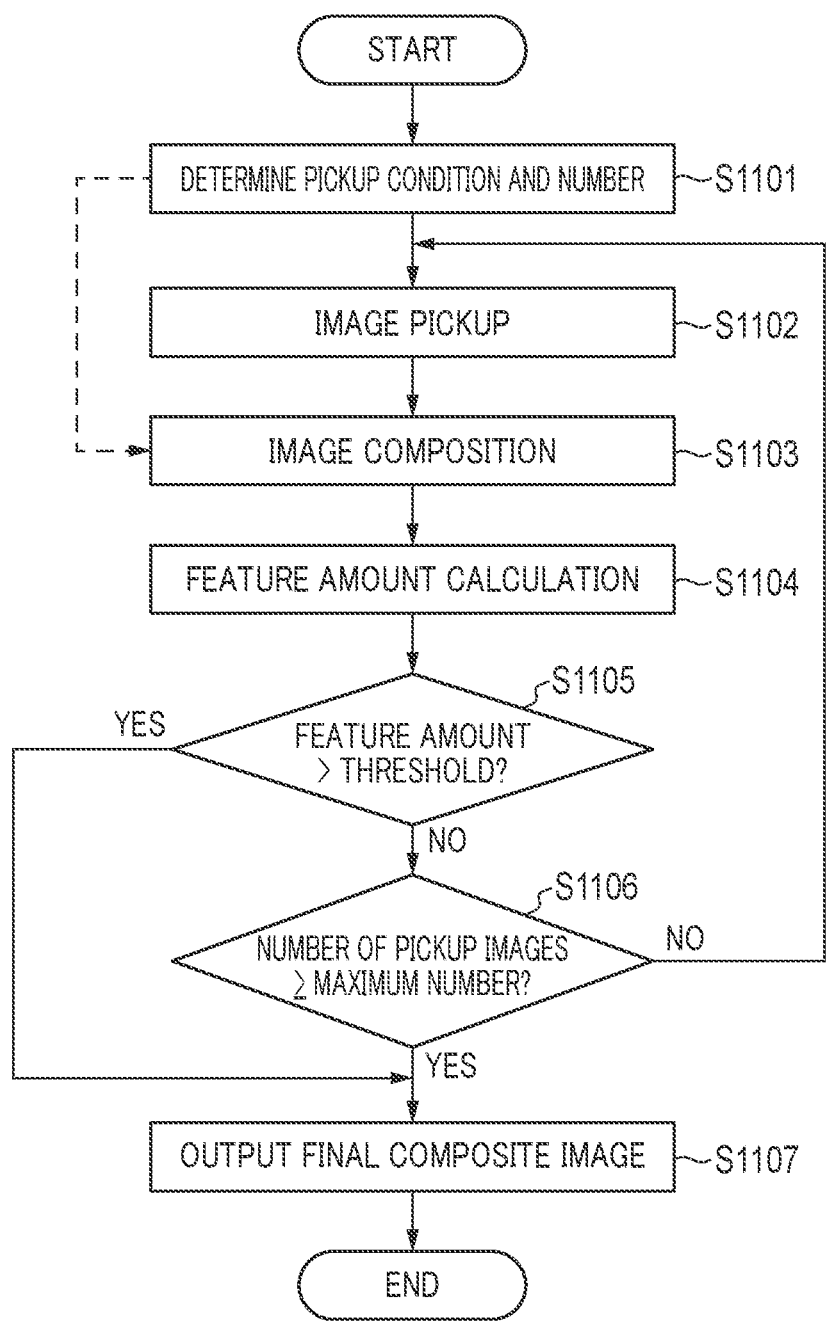
FIG. 11 is a flowchart showing a composite image generation process concerning the second embodiment.

FIG. 11 is a flowchart showing a composite image generation process concerning the second embodiment. As with the flowchart of FIG. 4, this process is executed when the controller 107 and the image processor 104 read programs that are beforehand held inside.

After the processes similar to that in the steps S401 and S402 are performed in steps S1101 and S1102, the process proceeds to a step S1103 and the image composition is performed considering the image pickup condition determined in the step S1101.

Figure 12:
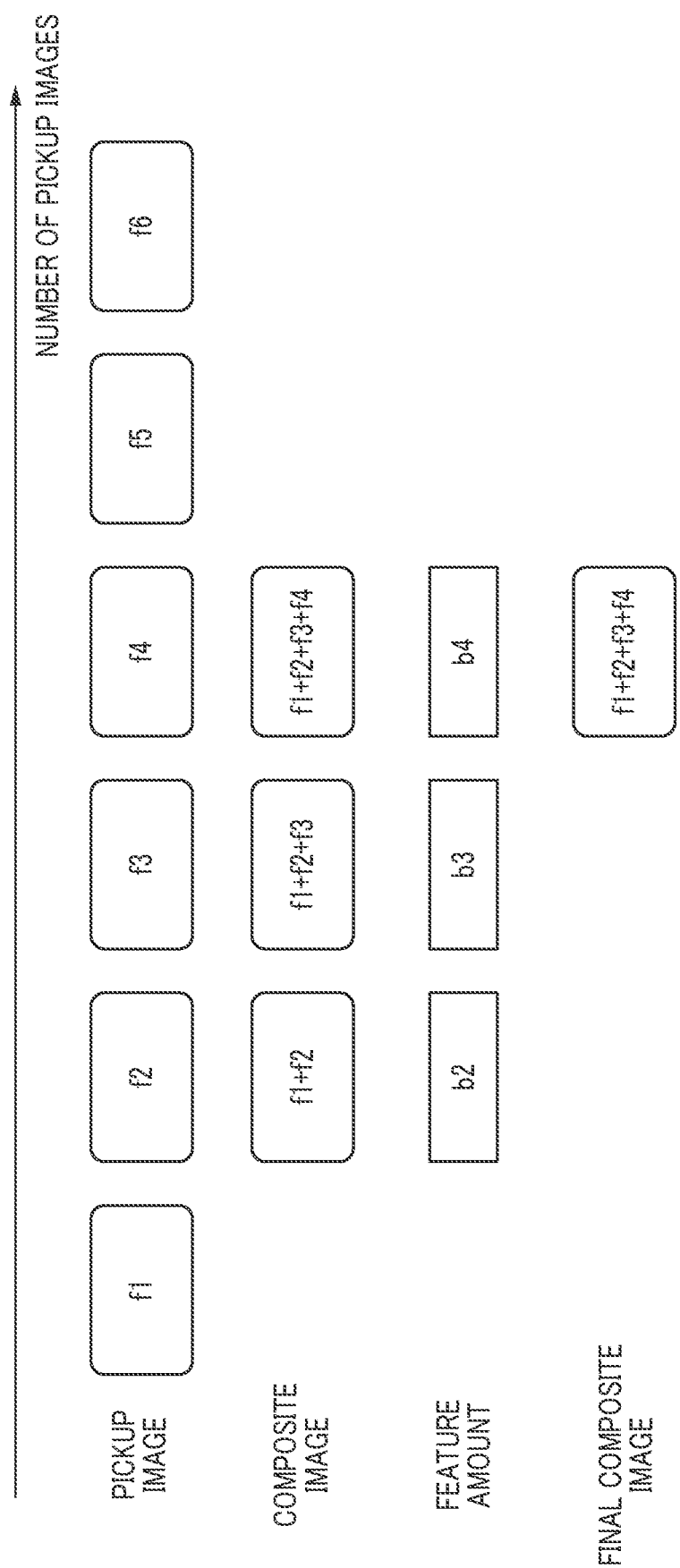
FIG. 12 is a view describing image composition executed in a step S1103 in FIG. 11 when an image pickup condition is "to pick up a high resolution image".
Figure 13A:
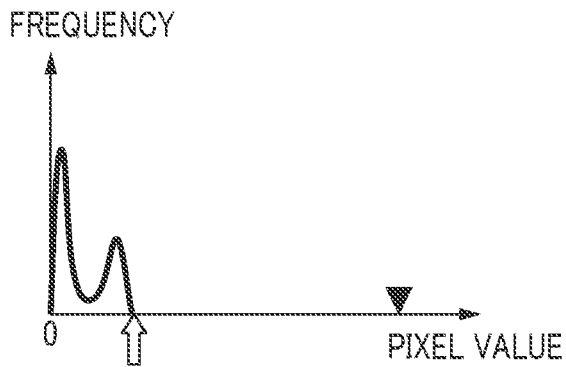
FIG. 13A through FIG. 13F are views describing feature amount calculation executed in a step S1104 in FIG. 11 and determination executed in a step S1105 when the image pickup condition is "to pick up a high resolution image".
Figure 13B:
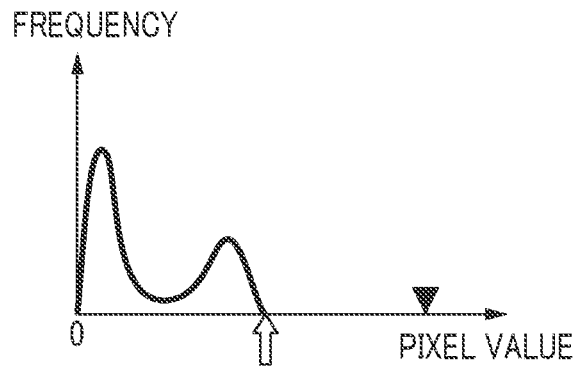
Figure 13C:
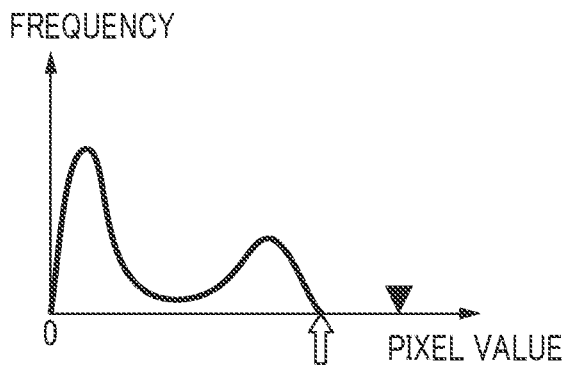
Figure 13D:
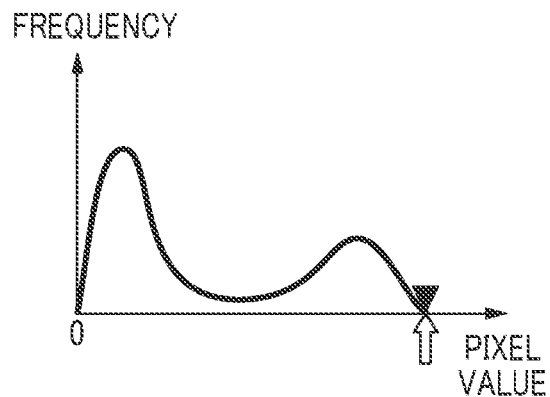
Figure 13E:
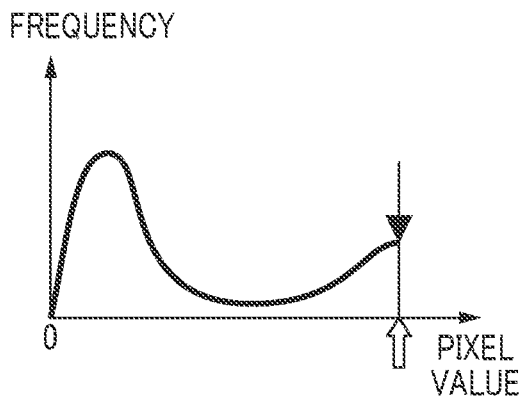
Figure 13F:
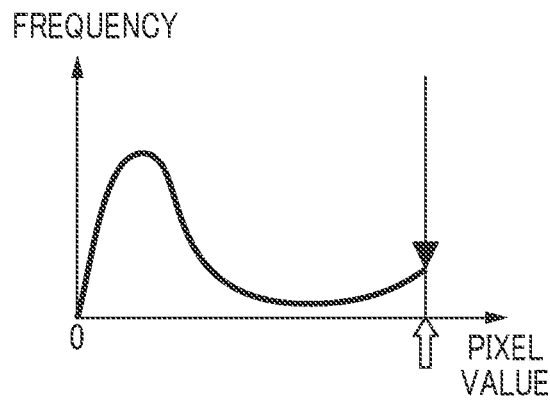

FIG. 12 shows pickup images, composite images, feature amounts of the composite images, and a final composite image from the top. Whenever the pickup images f1 through f6 are picked up, the composite images are generated successively and the feature amounts b2 through b4 of the composite images are calculated. When it is determined that the calculated feature amount satisfies the termination condition (the effect required by a user is sufficient), the image pickup operation stops, and the final composite image is output. Although FIG. 12 shows an example where pixel values of the pickup images f1, f2, and f3 is added simply to generate the third composite image, the pixel values may be weighed according to the image pickup condition actually.

Referring back to the flowchart of FIG. 11, the feature amount of the composite image generated in the step S1103 will be calculated according to the image pickup condition in a step S1104. After that, it is determined whether the feature amount of the composite image calculated in the step S1104 satisfies the termination condition in a step S1105.

In this example, the feature amount of the composite image is the maximum pixel value in the target region. When the maximum pixel value reaches an upper limit pixel value that a composite image is expressible (when the feature amount exceeds the threshold), it is determined that the feature amount satisfies the termination condition. Specifically, when a pixel value of a composite image is expressed by 8 bits, the upper limit pixel value that a composite image is expressible is 255. Accordingly, when the maximum value of the pixel value in the target region reaches 255, it is determined that the feature amount satisfies the termination condition. This state is described using FIG. 13A through FIG. 13F. FIG. 13A through FIG. 13F are graphs that show histograms of the pixel values in the target region 302 of the respective composite images shown in FIG. 12. In each of the graphs, a horizontal axis shows a pixel value, and a vertical axis shows a frequency. Whenever an image is picked up, the histogram of the composite image varies from FIG. 13A to FIG. 13F. In FIG. 13A through FIG. 13F, an upward white arrow indicates the maximum pixel value (feature amount) in the target region 302 of the composite image. Moreover, a downward black triangle indicates the upper limit pixel value (threshold) that a composite image is expressible. Whenever a composite image is generated, the maximum pixel value in the target region 302 is found as a feature amount. When the found feature amount does not reach the upper limit pixel value that a composite image is expressible, an image pickup operation is repeated.

At this time, the exposure value at the time of picking up an image may be adjusted using the upper limit pixel value that a composite image is expressible so that the maximum pixel value of the composite image will not exceed 255.

Referring back to the flowchart of FIG. 11, when the feature amount satisfies the termination condition in the step S1105, it is determined that the image having the maximum pixel value that the user requires has been obtained, the image pickup operation is stopped, and the process proceeds to a step S1107. In the meantime, when the feature amount does not satisfy the termination condition, it is determined that the image having the maximum pixel value that the user requires has not been obtained, and the process proceeds to a step S1106. In the step S1106, after performing the same determination as the step S406, the process proceeds to the step S1102 or the step S1107.

The final composite image is output in the step S1107 like the step S407 in FIG. 4, and this process is finished.

Next, an example of the image composition in a case where the image pickup condition is "to pick up an image having a wide dynamic range" will be described using FIG. 11 and FIG. 14A through FIG. 14D.

When the composite image generation process of FIG. 11 is started, the same process as the step S401 in FIG. 4 is performed in the step S1101 first. In this example, a width of a dynamic range that a user requires is determined as a threshold used as a termination condition in the step S1101.

Next, the same process as the step S402 in FIG. 4 is performed in the step S1102. In this example, when a second or later pickup image is generated, an image pickup operation is performed under a condition where an exposure value is increased by a certain amount from the previous image pickup operation according to the exposure condition 1005. After that, the image composition that considers the image pickup condition determined in the step S1101 is performed in the step S1103. That is, the image composition unit 205 generates the composite image by adding a series of every image of the object that is picked up by the image sensor 103 under the different exposure conditions.

Figure 14A:
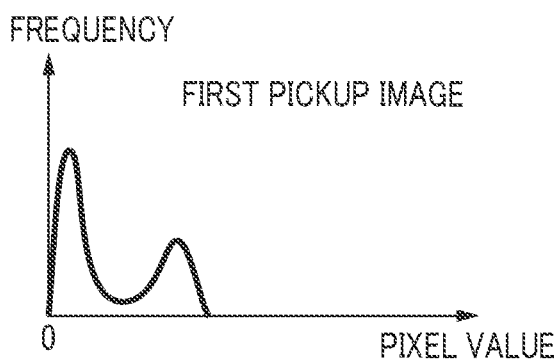
FIG. 14A through FIG. 14D are graphs showing an example of image composition when an image pickup condition concerning a second embodiment is "to pick up an image having a wide dynamic range".
Figure 14B:
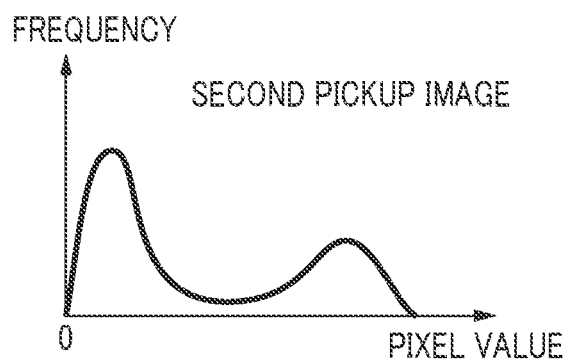
Figure 14C:
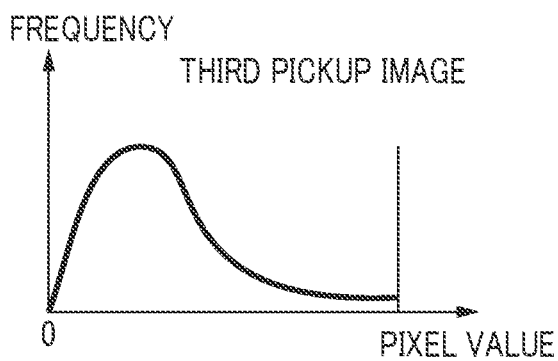
Figure 14D:
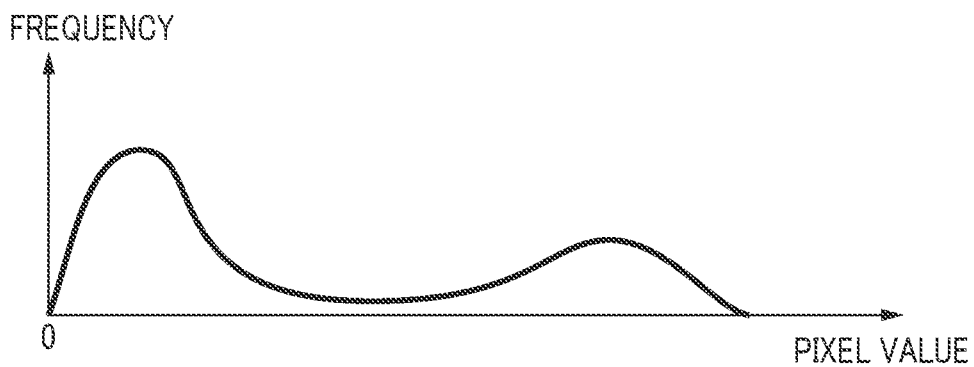

FIG. 14A through FIG. 14C show histograms of pixel values in the target region 302 shown in FIG. 3 in the pickup images obtained while increasing the exposure value in the order. In addition, although the histogram essentially includes two peaks, only one peak is observed in the histogram exemplified in FIG. 14C because the pickup image is saturated due to overexposure. In the stage where the three pickup images have been obtained, the composite image is generated by converting the pixel values of the pickup images so that the exposures of the pickup images will be identical. FIG. 14D shows a histogram of the pixel values in the target region 302 shown in FIG. 3 in this composite image. In the composite image generated in this example, a high luminance part is composited preponderantly using the pixel values of the first pickup image of which the histogram is shown in FIG. 14A. Moreover, a medium luminance part is composited preponderantly using the pixel values of the second pickup image of which the histogram is shown in FIG. 14B. A low luminance part is composited preponderantly using the pixel values of the third pickup image of which the histogram is shown in FIG. 14C. As a result, the composite image of which a dynamic range is larger than that of one pickup image can be obtained. Although a start timing of generating the composite image is set in the stage where three pickup images have been obtained in this embodiment, the start timing may be set in another stage as long as a plurality of pickup images have been obtained at the stage concerned.

Referring back to the flowchart of FIG. 11, a width of the dynamic range is calculated as a feature amount using the histogram of FIG. 14D in the step S1104.

When the width (feature amount) of the dynamic range calculated in the step S1105 reaches the threshold set in the step S1101, it is determined that the image having the dynamic range of which the width is required by the user is obtained, the image pickup operation is stopped, and the process proceeds to the step S1107. In the meantime, when the feature amount does not reach the threshold, it is determined that the image having the dynamic range of which the width is required by the user is not obtained, the process returns to the step S1102, and a new image pickup operation is performed while increasing the exposure value by the certain amount from the exposure value of the previous image pickup operation.

As mentioned above, composite images are generated successively by picking up images considering the image pickup condition in this embodiment. And when the feature amount of the generated composite image satisfies the termination condition, the composite image is output as the final composite image. Accordingly, a composite image having a sufficient effect required by a user is obtained without considering the required number of pickup images by the user.

It should be noted that the present invention may be used for starlit sky photography etc. In such a case, when a plurality of images are composited, pre-processes like alignment etc. are necessary.

Moreover, the present invention includes a case where a composite image is generated in order to obtain an object or an effect other than the image pickup conditions exemplified in the first and second embodiments. In this case, a threshold that becomes a termination condition, and a method for calculating a feature amount of a composite image are set up according to the object or the effect. In some cases, an object or an effect is considered when a composite image is generated.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-018947, filed Feb. 6, 2020, which is hereby incorporated by reference herein in its entirety.

What is claimed is:

1. An image pickup apparatus comprising:
   an image sensor configured to pick up an image of an object;
   at least one memory configured to store instructions; and
   at least one processor in communication with the at least one memory and configured to execute the instructions to:
   obtain an image pickup condition of the object;
   determine a termination condition according to the image pickup condition;
   generate a composite image of a series of images of the object picked up by the image sensor when the image sensor picks up any image of the object;
   calculate a feature amount of the composite image when the composite image is generated; and
   output the composite image as a final composite image of which the feature amount satisfies the termination condition.

2. The image pickup apparatus according to claim 1, wherein the image pickup condition is a condition to pick up an image having an effect that emphasizes a flow of a fluid object, and
   wherein the termination condition is related with smoothness of the object in the final composite image.

3. The image pickup apparatus according to claim 1, wherein the at least one processor further executes instructions to generate the composite image by calculating an average of the series of images picked up by the image sensor.

4. The image pickup apparatus according to claim 1, wherein the feature amount includes a variation of a histogram of the composite image, and
   wherein the at least one processor further executes instructions to determine that the termination condition is satisfied in a case where the variation of the histogram of the composite image becomes less than a first threshold.

5. The image pickup apparatus according to claim 1, wherein the feature amount includes a variation of a standard deviation of the composite image, and
   wherein the at least one processor further executes instructions to determine that the termination condition is satisfied in a case where the variation of the standard deviation of the composite image becomes less than a second threshold.

6. The image pickup apparatus according to claim 1, wherein the feature amount includes a variation of a difference absolute value sum that is calculated from differences between pixel values of the composite image and pixel values of a previous composite image that is generated just before, and
   wherein the at least one processor further executes instructions to determine that the termination condition is satisfied in a case where the variation of the difference absolute value sum becomes less than a third threshold.

7. The image pickup apparatus according to claim 1, wherein the at least one processor further executes instructions to generate the composite image considering the image pickup condition.

8. The image pickup apparatus according to claim 7, wherein the image pickup condition is to pick up a high resolution image,
   wherein the at least one processor further executes instructions to generate the composite image by adding the series of images of the object that is picked up by the image sensor, and
   wherein the termination condition is related with a maximum value of a pixel value in the final composite image.

9. The image pickup apparatus according to claim 7, wherein the image pickup condition is to pick up an image having a wide dynamic range,
   wherein the at least one processor further executes instructions to generate the composite image by adding the series of images of the object that is picked up by the image sensor under different exposure conditions, and
   wherein the termination condition is related with a dynamic range in the final composite image.

10. The image pickup apparatus according to claim 9, wherein the exposure conditions relate to at least one of exposure time, an aperture value, and a value of ISO.

11. A control method for an image pickup apparatus, the control method comprising:
    obtaining an image pickup condition of an object;
    determining a termination condition according to the image pickup condition;
    picking up an image of the object;
    generating a composite image of a series of images of the object picked up when any image of the object is picked up;
    calculating a feature amount of the composite image when the composite image is generated; and
    outputting the composite image as a final composite image of which the feature amount calculated satisfies the termination condition.

12. A non-transitory computer-readable storage medium storing a control program causing a computer to execute a control method for an image pickup apparatus, the control method comprising:
    obtaining an image pickup condition of an object;
    determining a termination condition according to the image pickup condition;
    picking up an image of the object;
    generating a composite image of a series of images of the object picked up when any image of the object is picked up;
    calculating a feature amount of the composite image when the composite image is generated; and
    outputting the composite image as a final composite image of which the feature amount calculated satisfies the termination condition.

13. An image processing apparatus comprising:
    at least one memory configured to store instructions; and
    at least one processor in communication with the at least one memory and configured to execute the instructions to:
    obtain an image of an object and an image pickup condition of the image;
    determine a termination condition according to the image pickup condition;
    generate a composite image of a series of images of the object when obtaining any image of the object;
    calculate a feature amount of the composite image when the composite image is generated; and
    output the composite image as a final composite image of which the feature amount satisfies the termination condition.

* * * * *